(12) United States Patent
Liu et al.

(10) Patent No.: US 8,831,269 B2
(45) Date of Patent: *Sep. 9, 2014

(54) BOBBIN AND LOUDSPEAKER USING THE SAME

(71) Applicants: Tsinghua University, Beijing (CN); Hon Hai Precision Industry Co., Ltd, New Taipei (TW)

(72) Inventors: Liang Liu, Beijing (CN); Jia-Ping Wang, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/942,449

(22) Filed: Jul. 15, 2013

(65) Prior Publication Data
US 2013/0301868 A1 Nov. 14, 2013

Related U.S. Application Data

(63) Continuation of application No. 12/824,349, filed on Jun. 28, 2010, now Pat. No. 8,515,117.

(30) Foreign Application Priority Data

Sep. 30, 2009 (CN) .................. 2009 1 01905700

(51) Int. Cl.

| | | |
|---|---|---|
| H04R 1/02 | (2006.01) |
| H04R 7/00 | (2006.01) |
| H04R 25/00 | (2006.01) |
| B06B 1/06 | (2006.01) |
| B32B 1/08 | (2006.01) |
| B32B 3/00 | (2006.01) |
| B32B 3/26 | (2006.01) |
| B32B 5/00 | (2006.01) |
| B32B 9/00 | (2006.01) |
| B32B 3/30 | (2006.01) |
| H01B 1/04 | (2006.01) |
| B32B 5/16 | (2006.01) |
| H04R 1/00 | (2006.01) |
| B32B 3/02 | (2006.01) |
| C01B 31/02 | (2006.01) |
| B32B 5/02 | (2006.01) |
| H04R 9/04 | (2006.01) |
| B82B 3/00 | (2006.01) |
| H04R 23/00 | (2006.01) |
| B82Y 40/00 | (2011.01) |
| B82Y 30/00 | (2011.01) |

(52) U.S. Cl.
CPC .. *H04R 1/00* (2013.01); *B32B 3/30* (2013.01); *H01B 1/04* (2013.01); *B32B 5/16* (2013.01); *B32B 3/02* (2013.01); *C01B 31/0233* (2013.01); *B32B 5/02* (2013.01); *B32B 5/024* (2013.01); *H04R 9/046* (2013.01); *B82B 3/0047* (2013.01); *H04R 23/002* (2013.01); *B32B 1/08* (2013.01); *B82Y 40/00* (2013.01); *B82Y 30/00* (2013.01); *Y10S 977/742* (2013.01); *Y10S 977/932* (2013.01)
USPC ........... 381/394; 381/164; 381/386; 367/140; 977/742; 977/932; 181/167; 427/372.2; 428/98; 428/172; 428/408

(58) Field of Classification Search
CPC ...... H04R 23/002; B82Y 30/00; B82Y 40/00; C01B 31/0233; B32B 1/08; B32B 5/02; B32B 5/16; B32B 3/0047; H01B 1/04
USPC ........... 381/394, 164, 386; 367/140; 977/742, 977/932; 181/167; 427/372.2
See application file for complete search history.

(56) References Cited

U.S. PATENT DOCUMENTS

| | | | | |
|---|---|---|---|---|
| 6,863,942 B2 * | 3/2005 | Ren et al. | ...................... | 428/36.9 |
| 7,437,938 B2 * | 10/2008 | Chakraborty | ................... | 73/714 |
| 7,745,302 B2 * | 6/2010 | Zhang et al. | ................... | 438/409 |
| 8,068,626 B2 * | 11/2011 | Jiang et al. | ..................... | 381/164 |
| 8,073,164 B2 * | 12/2011 | Jiang et al. | ..................... | 381/164 |
| 8,253,122 B2 * | 8/2012 | Feng et al. | ................. | 250/504 R |

| | | | | |
|---|---|---|---|---|
| 8,288,723 B2* | 10/2012 | Zhang et al. | | 250/311 |
| 8,323,607 B2* | 12/2012 | Liu et al. | | 423/447.2 |
| 8,515,117 B2* | 8/2013 | Liu et al. | | 381/394 |
| 2008/0095694 A1* | 4/2008 | Nakayama et al. | | 423/445 B |
| 2008/0170982 A1* | 7/2008 | Zhang et al. | | 423/447.3 |
| 2009/0045005 A1* | 2/2009 | Byon et al. | | 181/167 |
| 2009/0047228 A1 | 2/2009 | Guerchet et al. | | |
| 2009/0110897 A1* | 4/2009 | Humfeld et al. | | 428/221 |
| 2009/0117434 A1* | 5/2009 | Liu et al. | | 429/30 |
| 2009/0197082 A1* | 8/2009 | Jiang et al. | | 428/367 |
| 2009/0220767 A1* | 9/2009 | Schlogl et al. | | 428/323 |
| 2009/0268559 A1* | 10/2009 | Jiang et al. | | 367/140 |
| 2009/0272946 A1* | 11/2009 | Lu | | 252/511 |
| 2009/0296528 A1* | 12/2009 | Jiang et al. | | 367/140 |
| 2010/0046784 A1* | 2/2010 | Jiang et al. | | 381/386 |
| 2010/0151297 A1* | 6/2010 | Zhang et al. | | 429/40 |
| 2010/0188934 A1* | 7/2010 | Qian et al. | | 367/140 |
| 2011/0038504 A1* | 2/2011 | Liu et al. | | 381/392 |
| 2011/0038505 A1* | 2/2011 | Liu et al. | | 381/407 |
| 2011/0063613 A1* | 3/2011 | Sun et al. | | 356/301 |
| 2011/0075878 A1* | 3/2011 | Liu et al. | | 381/394 |
| 2011/0096952 A1* | 4/2011 | Wang et al. | | 381/386 |
| 2011/0096953 A1* | 4/2011 | Liu et al. | | 381/398 |
| 2011/0318984 A1* | 12/2011 | Liu et al. | | 442/189 |

* cited by examiner

*Primary Examiner* — David Warren

*Assistant Examiner* — Christina Russell

(74) *Attorney, Agent, or Firm* — Novak Druce Connolly Bove + Quigg LLP

(57) ABSTRACT

A bobbin includes a stratiform composite structure. The stratiform composite structure includes an amorphous carbon structure and a carbon nanotube film structure composited with the amorphous carbon structure. The amorphous carbon structure and the carbon nanotube film structure are combined by van der Waals attractive force and covalent bonds therebetween.

20 Claims, 13 Drawing Sheets ated power of the loudspeaker. The rated power is the highest input power by which the loudspeaker can produce sound without the audible distortion. Additionally, the lighter the weight of the elements in the loudspeaker, such as the weight of the bobbin and the weight per unit area of the diaphragm, the smaller the energy required for causing the diaphragm to vibrate, the higher the energy conversion efficiency of the loudspeaker, and the higher the sound volume produced by the same input power. Thus, the strength, the tensile modulus, and the weight of the bobbin are important factors affecting the sound volume of the loudspeaker. The weight of the bobbin is related to a thickness and a density thereof. Accordingly, the higher the specific strength (e.g., strength-to-density ratio), the smaller the thickness of the bobbin of the loudspeaker, and the higher the sound volume of the loudspeaker.

BOBBIN AND LOUDSPEAKER USING THE SAME

RELATED APPLICATIONS

This application is a continuation application of U.S. patent application Ser. No. 12/824,349, filed Jun. 28, 2010, entitled, "BOBBIN AND LOUDSPEAKER USING THE SAME," which claims all benefits accruing under 35 U.S.C. §119 from China Patent Application No. 200910190570.0, filed on Sep. 30, 2009, in the China Intellectual Property Office.

BACKGROUND

1. Technical Field

The present disclosure relates to bobbins and speakers adopting the same.

2. Description of Related Art

Among the various types of loudspeakers, electro-dynamic loudspeakers are most widely used because they have simple structures, good sound quality, and low costs. The electro-dynamic loudspeaker typically includes a diaphragm, a bobbin, a voice coil, a damper, a magnet, and a frame. The voice coil is an electrical conductor wrapped around the bobbin. The bobbin is connected to the diaphragm. The voice coil is placed in the magnetic field of the magnet.

To evaluate the quality of a loudspeaker, sound volume is a decisive factor. Sound volume of the loudspeaker relates to the input power of the electric signals and the conversion efficiency of the energy (e.g., the conversion efficiency of the electricity to sound). The larger the input power, the larger the conversion efficiency of the energy; and the bigger the sound volume of the loudspeaker. However, when the input power is increased to certain levels, the bobbin and diaphragm could deform or even break, thereby causing audible distortion. Therefore, the strength and tensile modulus of the elements in the loudspeaker are decisive factors of a rated power of the loudspeaker. The rated power is the highest input power by which the loudspeaker can produce sound without the audible distortion. Additionally, the lighter the weight of the elements in the loudspeaker, such as the weight of the bobbin and the weight per unit area of the diaphragm, the smaller the energy required for causing the diaphragm to vibrate, the higher the energy conversion efficiency of the loudspeaker, and the higher the sound volume produced by the same input power. Thus, the strength, the tensile modulus, and the weight of the bobbin are important factors affecting the sound volume of the loudspeaker. The weight of the bobbin is related to a thickness and a density thereof. Accordingly, the higher the specific strength (e.g., strength-to-density ratio), the smaller the thickness of the bobbin of the loudspeaker, and the higher the sound volume of the loudspeaker.

However, the typical bobbin is usually made of paper, cloth, polymer, or composite material. The rated power of the conventional loudspeakers is difficult to increase partly due to the restriction of the conventional material of the bobbin. In general, the rated power of a small sized loudspeaker is only 0.3 watt (W) to 0.5 W. A thicker bobbin has a larger specific strength, but increases the weight of the bobbin. Thus, it is difficult to improve the energy conversion efficiency of the loudspeaker. To increase the rated power, the energy conversion efficiency of the loudspeaker, and sound volume, the focus is on increasing the specific strength and decreasing the weight of the bobbin.

What is needed, therefore, is to provide a bobbin with high specific strength and light weight, and a loudspeaker using the same.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
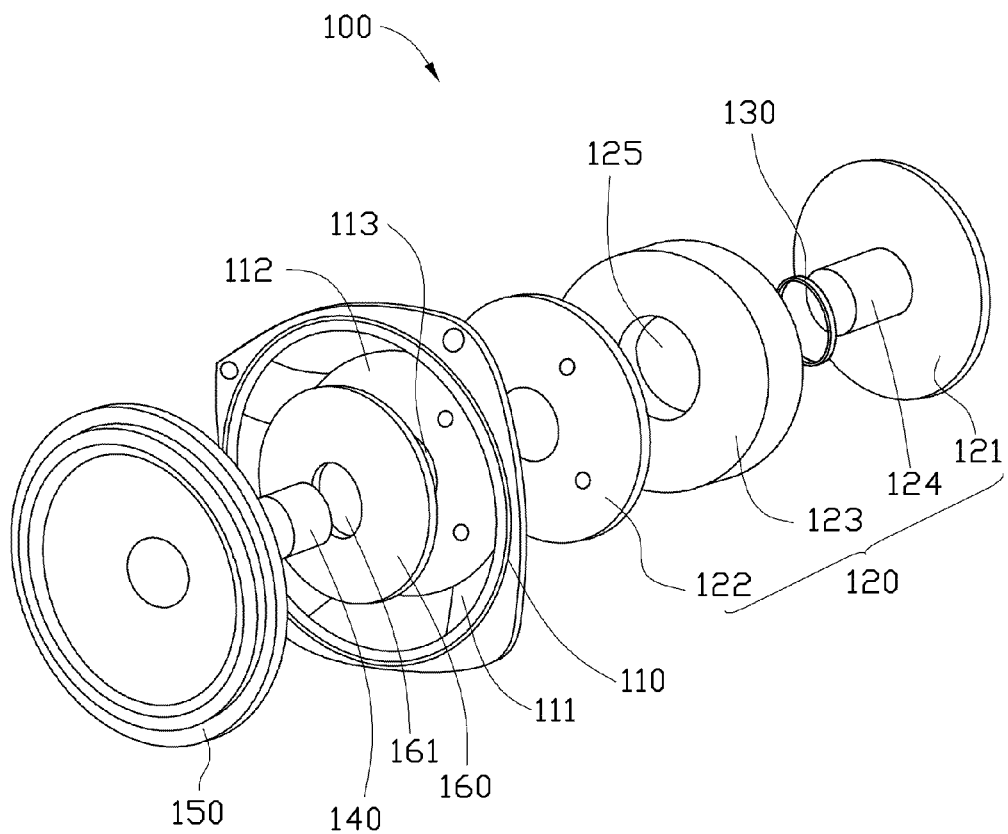
FIG. 1 is a schematic structural view of an embodiment of a loudspeaker.
Figure 2:
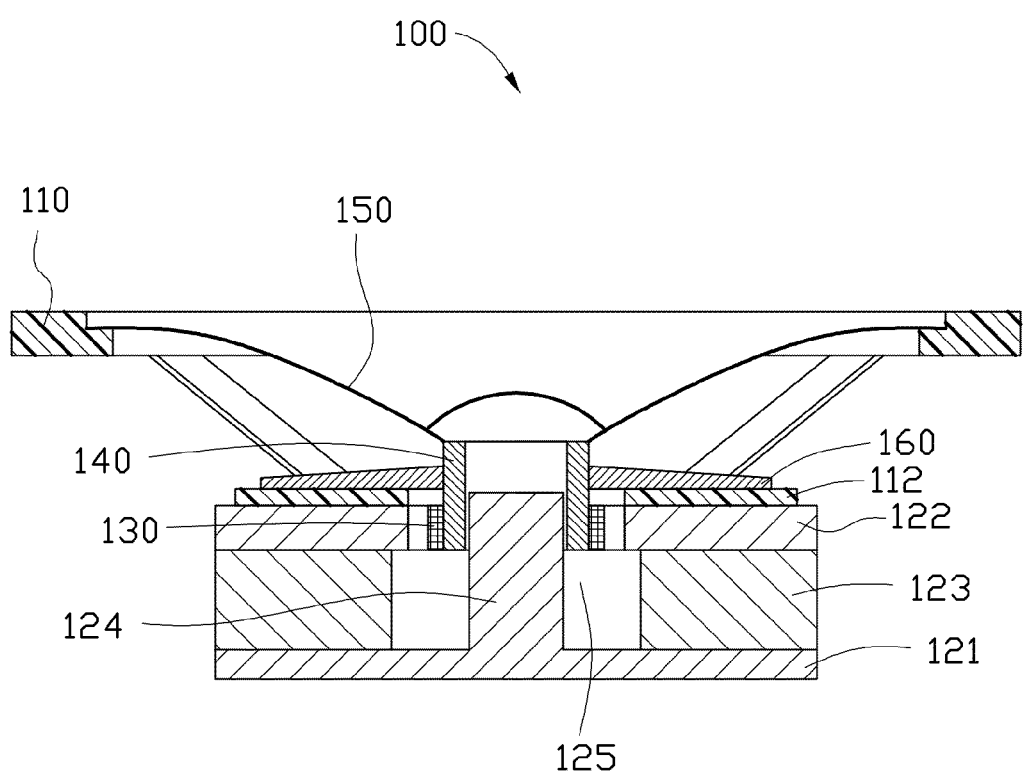
FIG. 2 is a cross-sectional view of the loudspeaker of FIG. 1.

Referring to FIG. 1 and FIG. 2, one embodiment of a loudspeaker 100 is shown. The loudspeaker 100 includes a frame 110, a magnetic circuit 120, a voice coil 130, a bobbin 140, a diaphragm 150 and a damper 160.

The frame 110 can be mounted on an upper side of the magnetic circuit 120. The voice coil 130 can be received in the magnetic circuit 120 and wind around the voice coil bobbin 140. An outer rim of the diaphragm 150 can be fixed to an inner rim of the frame 110, and an inner rim of the diaphragm 150 can be fixed to an outer rim of the bobbin 140 placed in the magnetic circuit 120.

The frame 110 can be a truncated cone with an opening on one end and includes a hollow cavity 111 and a bottom 112. The hollow cavity 111 can receive the diaphragm 150 and the damper 160. The bottom 112 can have a center hole 113. The center pole 124 can be extended through the center hole 113. The bottom 112 of the frame 110 can be fixed to the magnetic circuit 120.

The magnetic circuit 120 can include a lower plate 121, an upper plate 122, a magnet 123, and a center pole 124. The magnet 123 can be sandwiched by the lower plate 121 and the upper plate 122. The upper plate 122 and the magnet 123 can be circular, and define a substantially cylindrical shaped space in the magnetic circuit 120. The center pole 124 can be received in the substantially cylindrical shaped space and extend through the center hole 113. The center pole 124 can extend from the lower plate 121 to the upper plate 122 to define a magnetic gap 125 with the magnet 123. The magnetic circuit 120 can be fixed on the bottom 112 via the upper plate 122. The upper plate 122 can be fixed on the bottom 112 via adhesive or mechanical force. In one embodiment, according to FIG. 1, the upper plate 122 is fixed on the bottom 112 by screws (not shown).

The voice coil 130 wound on the bobbin 140 can be a driving member of the loudspeaker 100. The voice coil 130 can be made of conducting wire. When the electric signals are input into the voice coil 130, the variation of the electric signals can form a magnetic field. The interaction of the magnetic field caused by the voice coil 130 and the magnetic circuit 120 can produce the vibration of the voice coil 130. The vibration of the voice coil 130 causes the voice coil bobbin 140 to vibrate, which in turn, causes the diaphragm 150 fixed on the voice coil bobbin 140 to vibrate. The vibration of the diaphragm 150 causes the loudspeaker 100 to produce sound.

The diaphragm 150 is a sound producing member of the loudspeaker 100. The diaphragm 150 can have a conical shape if used in a large sized loudspeaker 100. If the loudspeaker 100 has a smaller size, the diaphragm 150 can have a planar circular shape or a planar rectangular shape. In one embodiment according to FIG. 1, the diaphragm 150 has a conical shape.

The damper 160 has a through hole therein to define an inner rim 161. The inner rim 161 of the damper 160 can be fixed to the bobbin 140. An outer rim of the damper 160 can be fixed to the frame 110. Thus, the damper 160 can mechanically hold the diaphragm 150 connected to the bobbin 140. The damper 160 can be a substantially ring-shaped plate having radially alternating circular ridges and circular furrows. Simultaneously, the damper 160 can include a plurality of concentric rings. The ridges and the furrows can be saw tooth shaped, wave shaped, involute shaped, or combinations thereof. In one embodiment, the ridges and the furrows are involute shaped. The damper 160 can be formed by means of hot pressing. The damper 160 can have a thickness of about 1 micrometer to about 1 millimeter.

A plurality of conductive wires (not shown) can be disposed on the damper 160. The connective wires can be fixed on the damper 160 via adhesive or mechanical force. The conductive wires electrically connect the voice coil 130 to a power source.

Figure 3:
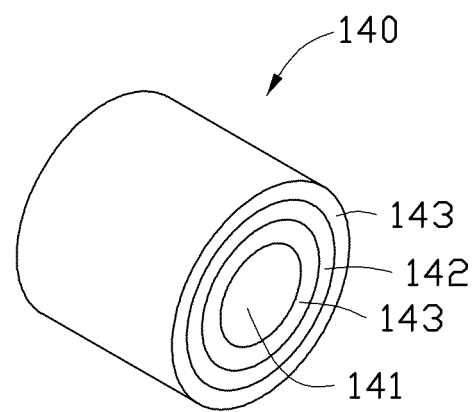
FIG. 3 is a schematic structural view of an embodiment of a bobbin.

Referring to FIG. 3, the bobbin 140 can be a hollow tubular structure having a through hole 141 therein. The center pole 124 can be disposed in the through hole 141 and spaced from the bobbin 140. When the voice coil 130 vibrates, the bobbin 140 and the diaphragm 150 also vibrate with the voice coil 130 to produce sound.

Figure 4:
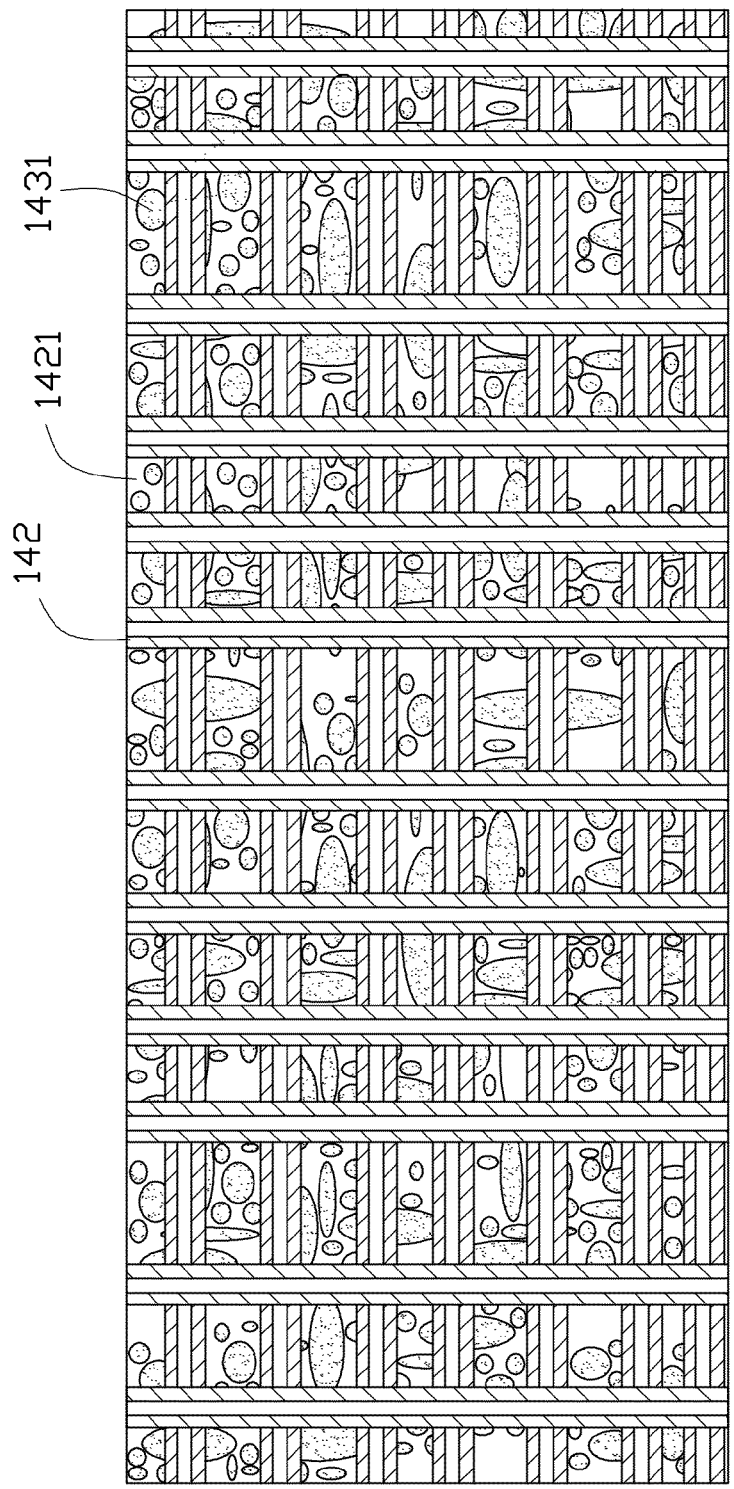
FIG. 4 is a magnification of a cross-sectional view of a part of a carbon nanotube composite structure of the bobbin.

Referring to FIG. 3 and FIG. 4, the bobbin 140 can include a carbon nanotube film structure 142 and an amorphous carbon structure 143 composited with the carbon nanotube film structure 142 to form a stratiform composite structure. A cylindrical configuration can be formed by the stratiform composite structure.

The carbon nanotube film structure 142 defines a plurality of micropores 1421. The carbon nanotube film structure 142 is capable of forming a free-standing structure. The term "free-standing structure" can be defined as a structure that does not have to be supported by a substrate. For example, a free-standing structure can sustain the weight of itself when it is hoisted by a portion thereof without any significant damage to its structural integrity. The free-standing structure of the carbon nanotube film structure 142 is realized by the carbon nanotubes joined by van der Waals attractive force. So, if the carbon nanotube film structure 142 is placed between two separate supporters, a portion of the carbon nanotube film structure 142 not in contact with the two supporters, would be suspended between the two supporters and yet maintain film structural integrity.

The carbon nanotube film structure 142 includes a plurality of carbon nanotubes uniformly distributed therein, and joined by van der Waals attractive force therebetween. The carbon nanotubes in the carbon nanotube film structure 142 can be orderly or disorderly arranged. The term 'disordered carbon nanotube film structure' includes, but is not limited to, a structure where the carbon nanotubes are arranged along many different directions, such that the number of the carbon nanotubes arranged along each different direction can be almost the same (e.g. uniformly disordered), and/or entangled with each other. 'Ordered carbon nanotube film structure' includes, but is not limited to, a structure where the carbon nanotubes are arranged in a consistently systematic manner, e.g., the carbon nanotubes are arranged approximately along a same direction and or have two or more sections within each of which the carbon nanotubes are arranged approximately along a same direction (different sections can have different directions). The carbon nanotubes in the carbon nanotube film structure 142 can be single-walled, double-walled, and/or multi-walled carbon nanotubes.

Macroscopically, the carbon nanotube film structure 142 may have a substantially planar structure. The planar carbon nanotube structure can have a thickness of about 0.5 nanometers to about 100 microns. The carbon nanotube film structure 142 includes a plurality of carbon nanotubes and defines a plurality of micropores 1421 having a size of about 1 nanometer to about 10 micrometers. The carbon nanotube film structure 142 includes at least one carbon nanotube film, the at least one carbon nanotube film includes a plurality of carbon nanotubes substantially parallel to a surface of the corresponding carbon nanotube film.

Figure 5:
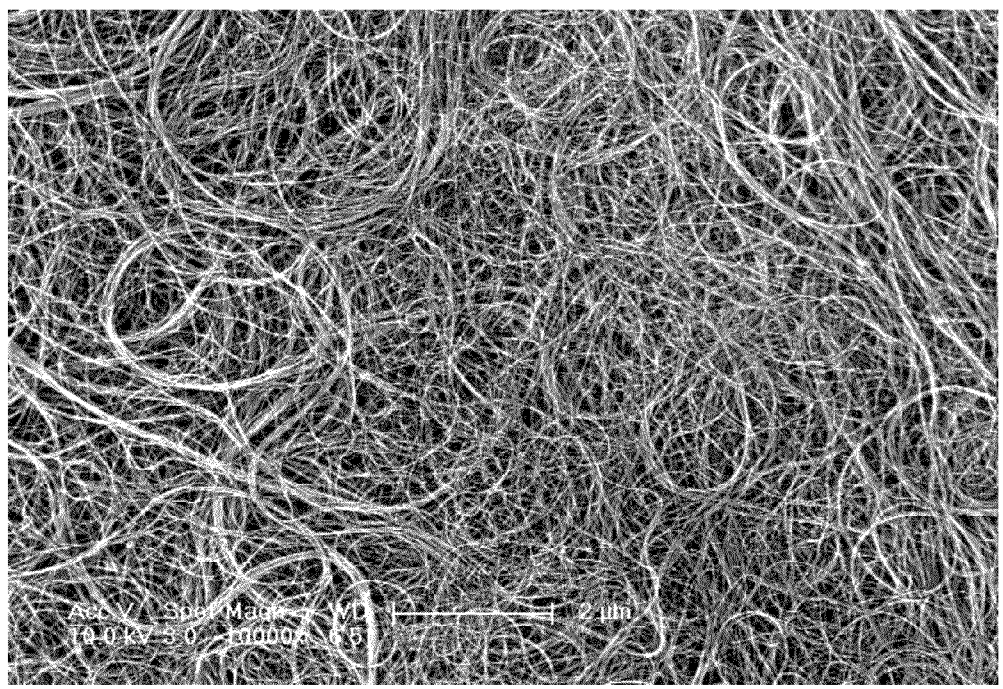
FIG. 5 shows a Scanning Electron Microscope (SEM) image of a flocculated carbon nanotube film.

The carbon nanotube film structure 142 can include a flocculated carbon nanotube film as shown in FIG. 5. The flocculated carbon nanotube film can include a plurality of long, curved, disordered carbon nanotubes entangled with each other and can form a free-standing structure. Further, the flocculated carbon nanotube film can be isotropic. The carbon nanotubes can be substantially uniformly dispersed in the carbon nanotube film. The adjacent carbon nanotubes are acted upon by the van der Waals attractive force therebetween, thereby forming an entangled structure with micropores 1421 defined therein. Alternatively, the flocculated carbon nanotube film is very porous. Sizes of the micropores 1421 can be about 1 nanometer to about 10 micrometers. Further, due to the carbon nanotubes in the carbon nanotube structure being entangled with each other, the carbon nanotube film structure 142 employing the flocculated carbon nanotube film has excellent durability, and can be fashioned into desired shapes with a low risk to the integrity of carbon nanotube structure. The flocculated carbon nanotube film, in some embodiments, will not require the use of structural support or due to the carbon nanotubes being entangled and adhered together by van der Waals attractive force therebetween. The flocculated carbon nanotube film can have a thickness of about 0.5 nanometers to about 100 microns.

Figure 6:
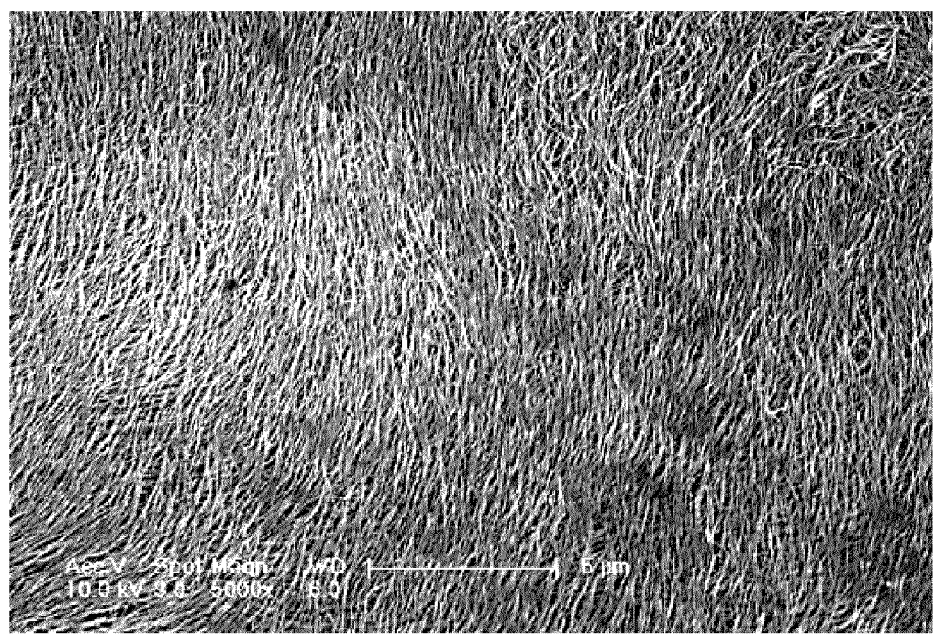
FIG. 6 shows an SEM image of a pressed carbon nanotube film.

The carbon nanotube film structure 142 can include a pressed carbon nanotube film. The carbon nanotubes in the pressed carbon nanotube film can be arranged along a same direction or arranged along different directions. The carbon nanotubes in the pressed carbon nanotube film can rest upon each other. The adjacent carbon nanotubes are combined and attracted to each other by van der Waals attractive force, and can form a free-standing structure. An angle between a primary alignment direction of the carbon nanotubes and a surface of the pressed carbon nanotube film can be in a range from approximately 0 degrees to approximately 15 degrees. The pressed carbon nanotube film can be formed by pressing a carbon nanotube array. The angle is closely related to the pressure applied to the carbon nanotube array. The greater the pressure, the smaller the angle. The carbon nanotubes in the carbon nanotube film can be substantially parallel to the surface of the carbon nanotube film if the angle is about 0 degrees. A length and a width of the carbon nanotube film can be set as desired. The pressed carbon nanotube film can include a plurality of carbon nanotubes substantially aligned along one or more directions. The pressed carbon nanotube film can be obtained by pressing the carbon nanotube array with a pressure head. Alternatively, the shape of the pressure head and the pressing direction can determine the direction of the carbon nanotubes arranged therein. Specifically, in one embodiment, a planar pressure head is used to press the carbon nanotube array along the direction substantially perpendicular to a substrate. A plurality of carbon nanotubes pressed by the planar pressure head may be sloped in many directions. In another embodiment, as shown in FIG. 6, if a roller-shaped pressure head is used to press the carbon nanotube array along a certain direction, a pressed carbon nanotube film having a plurality of carbon nanotubes substantially aligned along a certain direction can be obtained. In another embodiment, if the roller-shaped pressure head is used to press the carbon nanotube array along different directions, a pressed carbon nanotube film having a plurality of carbon nanotubes substantially aligned along different directions can be obtained. The pressed carbon nanotube film can have a thickness of about 0.5 nanometers to about 100 microns, and can define a plurality of micropores 1421 having a diameter of about 1 nanometer to about 10 micrometers.

Figure 7:
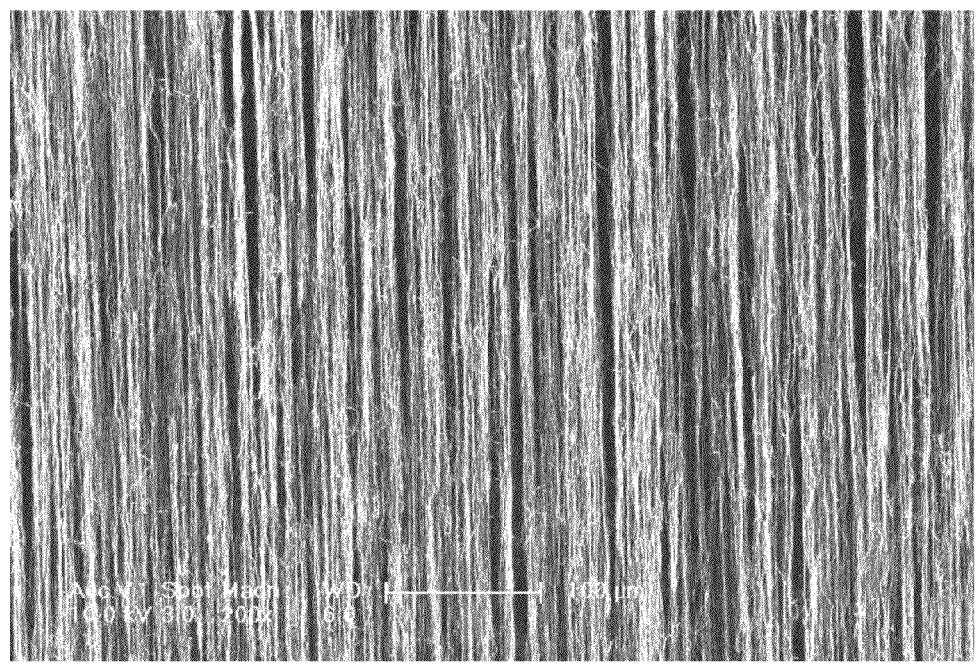
FIG. 7 shows an SEM image of a drawn carbon nanotube film.

In some embodiments, the carbon nanotube film structure 142 includes at least one drawn carbon nanotube film as shown in FIG. 7. The drawn carbon nanotube film can have a thickness of about 0.5 nanometers to about 100 microns. The drawn carbon nanotube film includes a plurality of carbon nanotubes that can be arranged substantially parallel to a surface of the drawn carbon nanotube film. A plurality of micropores 1421 having a size of about 1 nanometer to about 10 micrometers can be defined by the carbon nanotubes. A large number of the carbon nanotubes in the drawn carbon nanotube film can be oriented along a preferred orientation, meaning that a large number of the carbon nanotubes in the drawn carbon nanotube film are arranged substantially along the same direction. An end of one carbon nanotube is joined to another end of an adjacent carbon nanotube arranged substantially along the same direction, by van der Waals attractive force. More specifically, the drawn carbon nanotube film includes a plurality of successively oriented carbon nanotube segments joined end-to-end by van der Waals attractive force therebetween. Each carbon nanotube segment includes a plurality of carbon nanotubes substantially parallel to each other, and joined by van der Waals attractive force therebetween.

The carbon nanotube segments can vary in width, thickness, uniformity and shape. A small number of the carbon nanotubes are randomly arranged in the drawn carbon nanotube film, and has a small, if not negligible, effect on the larger number of the carbon nanotubes in the drawn carbon nanotube film arranged substantially along the same direction. The carbon nanotube film is capable of forming a free-standing structure.

Understandably, some variation can occur in the orientation of the carbon nanotubes in the drawn carbon nanotube film as can be seen in FIG. 7. Microscopically, the carbon nanotubes oriented substantially along the same direction may not be perfectly aligned in a straight line, and some curve portions may exist. Furthermore, it can be understood that some carbon nanotubes located substantially side by side and oriented along the same direction and in our contact with each other.

Figure 8:
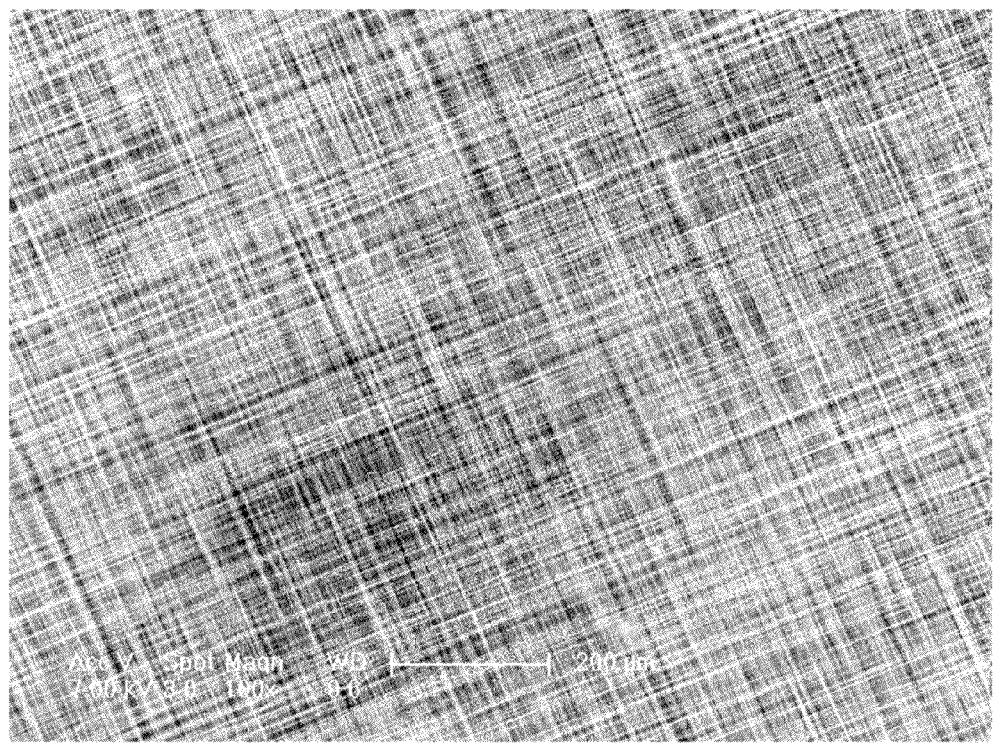
FIG. 8 shows an SEM image of a carbon nanotube film structure consisting of a plurality of stacked drawn carbon nanotube films.

Referring to FIG. 8, in one embodiment, the carbon nanotube film structure 142 includes a plurality of stacked drawn carbon nanotube films. The number of the layers of the drawn carbon nanotube films is not limited. Adjacent drawn carbon nanotube films can be adhered by only van der Waals attractive forces therebetween. An angle can exist between the carbon nanotubes in adjacent drawn carbon nanotube films. The angle between the aligned directions of the adjacent drawn carbon nanotube films can range from about 0 degrees to about 90 degrees. In one embodiment, the angle between the aligned directions of the adjacent drawn carbon nanotube films is about 90 degrees, thus a plurality of substantially uniform micropores 1421 are defined by the carbon nanotube film structure 142.

If the carbon nanotubes of the carbon nanotube film structure 142 are aligned along one direction or some predetermined directions, a higher specific strength can be achieved along the direction of the carbon nanotubes in the carbon nanotube film structure 142. Therefore, by arranging the carbon nanotube film structure 142 to set the carbon nanotubes therein aligned along a particular direction, the specific strength of the bobbin 140 along this direction can be improved.

The amorphous carbon structure 143 can be infiltrated into the micropores 1421. "Amorphous carbon" is an allotrope of carbon that does not have any crystalline structure. The amorphous carbon has no long-range crystalline order therein. A short-range order can exist, but with deviations of the interatomic distances and/or inner-bonding angles with respect to a graphite lattice as well as to a diamond lattice. The amorphous carbon structure 143 can include a plurality of amorphous carbon particles 1431 in the micropores 1421. The amorphous carbon particles 1431 can be combined by covalent bonds therebetween. The amorphous carbon particles 1431 can be adhered to the carbon nanotubes. The amorphous carbon particles 1431 can also enwrap the carbon nanotubes therein, thus, the carbon nanotubes can be encapsulated in the amorphous carbon particles 1431. The amorphous carbon particles 1431 and the carbon nanotubes can be combined by Van der Waals attractive forces and covalent bonds therebetween. The covalent bonds can be an $sp^2$ hybridized bond or an $sp^3$ hybridized bond between carbon atoms. A plurality of amorphous carbon particles 1431 can also be disposed on opposite surfaces of the carbon nanotube film structure 142 to form two amorphous carbon layers. Thus, the amorphous carbon structure 143 can enwrap the carbon nanotube film structure 142. A cavernous shaped structure can be formed by the amorphous carbon structure 143. The carbon nanotube film structure 142 can be embedded in the cavernous structure.

The amorphous carbon structure 143 can be obtained by carbonizing a polymer, such as polyacrylonitrile fiber, asphalt fiber, viscose fiber, or phenolic fiber, at a carbonization temperature. If the polymer is carbonized in a vacuum or with inert gases, the carbonization temperature can be lower than or equal to 1000° C. If the polymer is carbonized in normal atmosphere, the carbonization temperature can be lower than or equal to 500° C. to prevent the carbon nanotubes from being oxidized.

Figure 9:
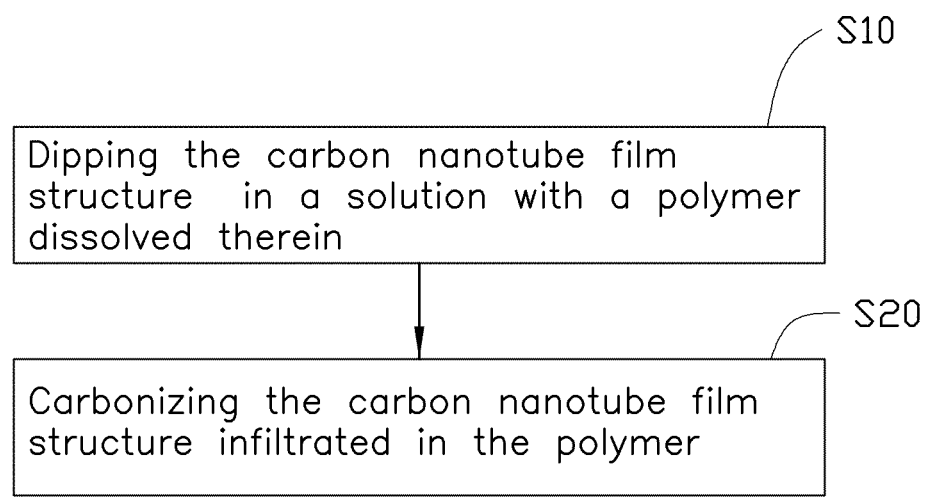
FIG. 9 is a flowchart of the method for making the stratiform composite structure according to one embodiment.

Referring to FIG. 9, in one embodiment, the stratiform composite structure can be formed by the following steps: S10, dipping the carbon nanotube film structure 142 in a solution with a polymer dissolved therein; and S20, carbonizing the carbon nanotube film structure 142 infiltrated in the polymer.

In step S10, the polymer and the carbon nanotube film structure 142 can be combined together by Van der Waals attractive forces and covalent bonds therebetween. In step S20, the polymer can be carbonized to amorphous carbon particles 1431 combined by covalent bonds therebetween.

Figure 10:
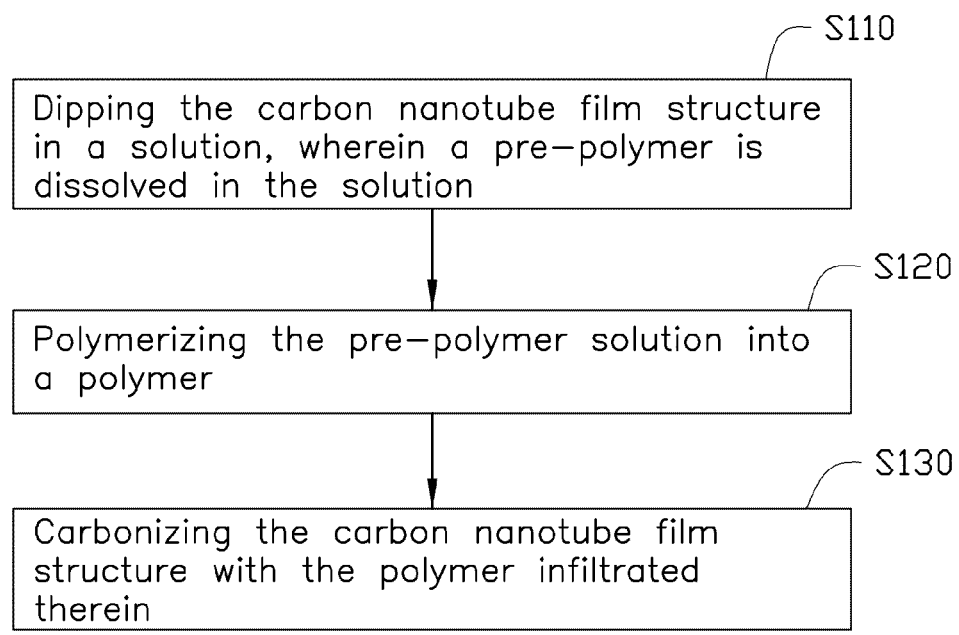
FIG. 10 is a flowchart of the method for making the stratiform composite structure according to another embodiment.

Referring to FIG. 10, in one embodiment, the stratiform composite structure can be formed by the following steps:

S110, dipping the carbon nanotube film structure 142 in a solution, wherein a pre-polymer is dissolved in the solution;

S120, polymerizing the pre-polymer solution into a polymer; and

S130, carbonizing the carbon nanotube film structure 142 with the polymer infiltrated therein.

In step S110, the pre-polymer can be acrylonitrile, ethyl acrylate, butyl acrylate, styrene, butadiene, or combinations thereof.

Both the carbon nanotubes of the carbon nanotube film structure 142 and the amorphous carbon particles 1431 of the amorphous carbon structure 143 are carbon materials. Thus, a density of the bobbin 140 can be smaller, and accordingly, a weight of the bobbin 140 can be lighter. A higher energy conversion efficiency of the loudspeaker 100 can be obtained. The carbon nanotubes and the amorphous carbon particles 1431 are combined by the covalent bonds therebetween. A stress and a tensility formed by the bobbin 140 can be borne by most of the carbon nanotubes and the amorphous carbon particles 1431, when the bobbin 140 moves up and down with the diaphragm 150. Thus, a higher specific strength of the bobbin 140 can be achieved. A higher volume of the loudspeaker 100 can be obtained.

Figure 11:
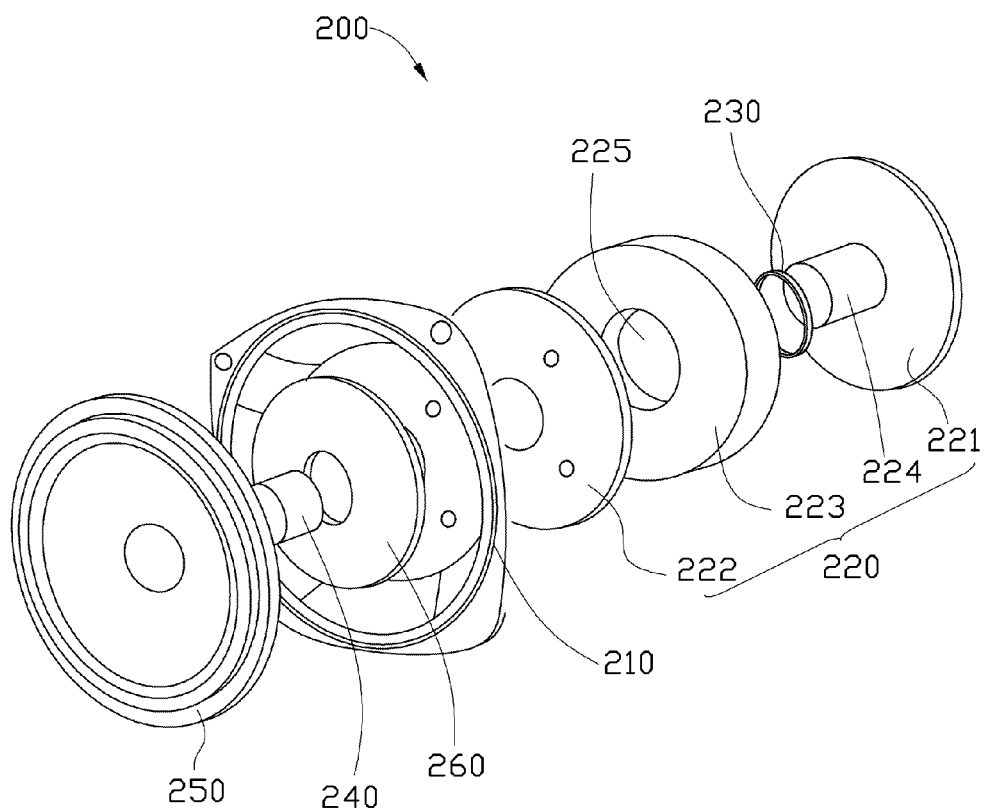
FIG. 11 is a schematic structural view of an embodiment of a loudspeaker.

Referring to FIG. 11, another embodiment of a loudspeaker 200 is shown. The loudspeaker 200 can include a frame 210, a magnetic circuit 220, a voice coil 230, a bobbin 240, a diaphragm 250, and a damper 260.

The frame 210 can be mounted on an upper side of the magnetic circuit 220. The voice coil 230 can be received in the magnetic circuit 220. The voice coil 230 can wind around the voice coil bobbin 240. An outer rim of the diaphragm 250 can be fixed to an inner rim of the frame 210, and an inner rim of the diaphragm 250 can be fixed to an outer rim of the bobbin 240 placed in the magnetic circuit 220. The bobbin 240 includes a carbon nanotube film structure and an amorphous carbon structure composited with the carbon nanotube film structure to form a stratiform composite structure. The magnetic circuit 220 includes a lower plate 221, an upper plate 222, a magnet 223, and a center pole 224. The magnet 223 is sandwiched by the lower plate 221 and the upper plate 222. The upper plate 222 and the magnet 223 are circular, and define a substantially cylindrical shaped space in the magnetic circuit 220. The center pole 224 extends from the lower plate 221 to the upper plate 222 to define a magnetic gap 225 with the magnet 223.

The compositions, features, and functions of the loudspeaker 200 in the embodiment shown in FIG. 11 are similar to the loudspeaker 100 in the embodiment shown in FIG. 1, except that the carbon nanotube film structure can include at least one carbon nanotube wire structure. The at least one carbon nanotube wire structure can include a plurality of carbon nanotubes joined end to end by van der Waals attractive force therebetween along an axial direction. The at least one carbon nanotube wire structure includes one or more carbon nanotube wires substantially parallel to each other to form a bundle-like structure or twisted with each other to form a twisted structure. The bundle-like structure and the twisted structure are two kinds of linear shaped carbon nanotube structures. The plurality of carbon nanotube wire structures can be woven together to form a planar shaped carbon nanotube structure.

Figure 12:
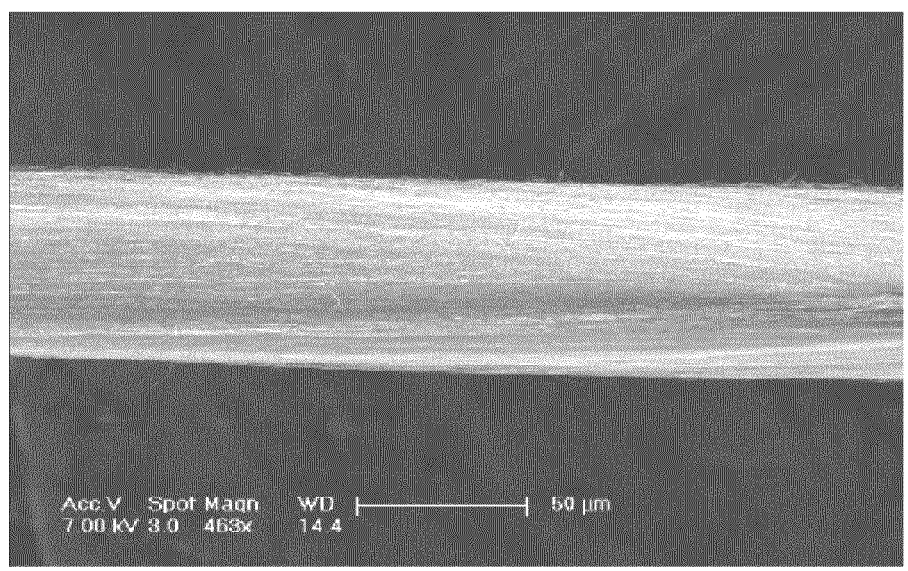
FIG. 12 shows an SEM image of an untwisted carbon nanotube wire.

The carbon nanotube wire can be untwisted or twisted. Treating the drawn carbon nanotube film with a volatile organic solvent can obtain the untwisted carbon nanotube wire. In one embodiment, the organic solvent can be applied to soak the entire surface of the drawn carbon nanotube film. During the soaking, adjacent substantially parallel carbon nanotubes in the drawn carbon nanotube film will bundle together, due to the surface tension of the organic solvent as it volatilizes, and thus, the drawn carbon nanotube film will be shrunk into an untwisted carbon nanotube wire. The untwisted carbon nanotube wire includes a plurality of carbon nanotubes substantially oriented along a same direction (i.e., a direction along the length direction of the untwisted carbon nanotube wire) as shown in FIG. 12. The carbon nanotubes are substantially parallel to the axis of the untwisted carbon nanotube wire. In one embodiment, the untwisted carbon nanotube wire includes a plurality of successive carbon nanotubes joined end to end by van der Waals attractive force therebetween. The length of the untwisted carbon nanotube wire can be arbitrarily set as desired. A diameter of the untwisted carbon nanotube wire ranges from about 0.5 nm to about 100 μm.

Figure 13:
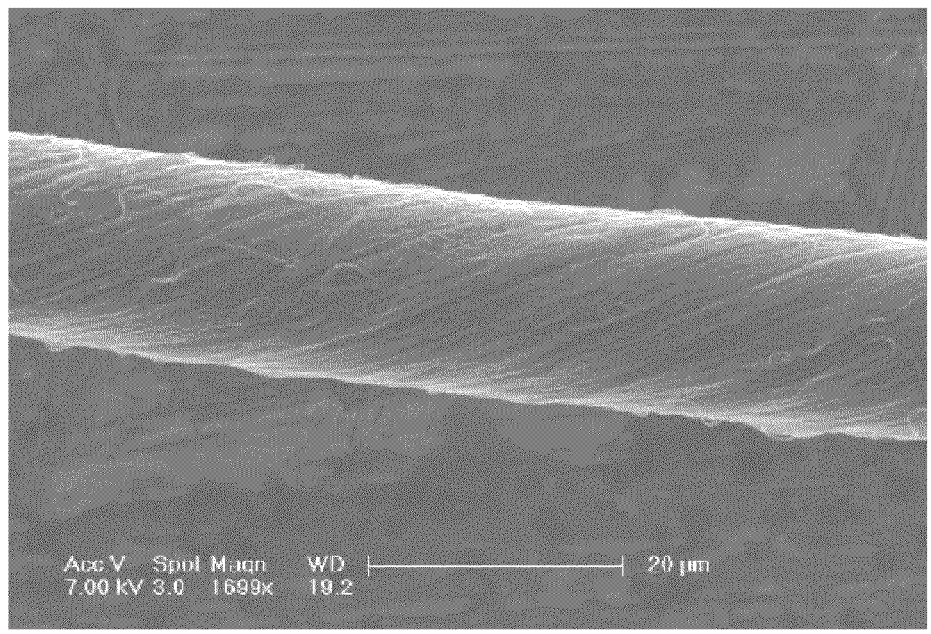
FIG. 13 shows an SEM image of a twisted carbon nanotube wire.

The twisted carbon nanotube wire can be obtained by twisting a drawn carbon nanotube film using a mechanical force to turn the two ends of the drawn carbon nanotube film in opposite directions. The twisted carbon nanotube wire includes a plurality of carbon nanotubes helically oriented around an axial direction of the twisted carbon nanotube wire as shown in FIG. 13. In one embodiment, the twisted carbon nanotube wire includes a plurality of successive carbon nanotubes joined end to end by van der Waals attractive force therebetween. The length of the carbon nanotube wire can be set as desired. A diameter of the twisted carbon nanotube wire can be about 0.5 nm to about 100 μm.

The carbon nanotube wire can be a free-standing structure. The length direction of the carbon nanotube wire can have a high specific strength. Therefore, by arranging the carbon nanotube wire to set the carbon nanotube wire aligned substantially along a particular direction, the specific strength of the bobbin 240 along this direction can be improved.

It is to be understood that the above-described embodiments are intended to illustrate rather than limit the present disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope, but do not restrict the scope of the disclosure.

What is claimed is:

1. A bobbin comprising:
a stratiform composite structure comprising an amorphous carbon structure and a carbon nanotube film structure composited with the amorphous carbon structure;
wherein the carbon nanotube film structure is a free-standing structure, the amorphous carbon structure and the carbon nanotube film structure are combined by van der Waals attractive force and covalent bonds therebetween.

2. The bobbin as claimed in claim 1, wherein the carbon nanotube film structure is enwrapped by the amorphous carbon structure.

3. The bobbin as claimed in claim 1, wherein the stratiform composite structure has a hollow tubular structure.

4. The bobbin as claimed in claim 3, wherein the hollow tubular structure comprises two amorphous carbon structures, and the carbon nanotube film structure is sandwiched between the two amorphous carbon structures.

5. The bobbin as claimed in claim 1, wherein the carbon nanotube film structure comprises a plurality of carbon nanotubes.

6. The bobbin as claimed in claim 5, wherein the plurality of carbon nanotubes are joined end to end by van der Waals attractive force therebetween.

7. The bobbin as claimed in claim 1, wherein the amorphous carbon structure comprises a plurality of amorphous carbon particles.

8. The bobbin as claimed in claim 7, wherein the carbon nanotube film structure comprises a plurality of carbon nanotubes and the plurality amorphous carbon particles adhere to the plurality of carbon nanotubes or enwrap the plurality of carbon nanotubes.

9. The bobbin as claimed in claim 7, wherein the plurality of amorphous carbon particles are combined together by covalent bonds therebetween.

10. The bobbin as claimed in claim 9, wherein the covalent bonds comprises an $sp^2$ hybridized bond or an $sp^3$ hybridized bond between carbon atoms.

11. The bobbin as claimed in claim 1, wherein the carbon nanotube film structure comprises a carbon nanotube film or a plurality of carbon nanotube films stacked together or coplanarly arranged, and the carbon nanotube film comprises a plurality of carbon nanotubes.

12. The bobbin as claimed in claim 11, wherein the carbon nanotube film is isotropic and the plurality of carbon nanotubes therein are entangled with each other.

13. The bobbin as claimed in claim 11, wherein the plurality of carbon nanotubes are substantially parallel to a surface of the carbon nanotube film.

14. The bobbin as claimed in claim 11, wherein the plurality of carbon nanotubes are substantially aligned in a single direction and joined end to end by van der Waals attractive force therebetween.

15. The bobbin as claimed in claim 1, wherein the carbon nanotube film structure comprises a carbon nanotube wire structure comprising at least one carbon nanotube wire comprising a plurality of carbon nanotubes joined end to end by van der Waals attractive force therebetween along an axial direction.

16. The bobbin as claimed in claim 1, wherein the carbon nanotube film structure comprises a plurality of carbon nanotube wire structures substantially parallel to each other, crossed with each other, or woven together.

17. The bobbin as claimed in claim 1, wherein the amorphous carbon structure is a cavernous shaped structure, and the carbon nanotube film structure is embedded in the cavernous shaped structure.

18. The bobbin as claimed in claim 1, wherein the carbon nanotube film structure comprises a plurality of ring-shaped carbon nanotube wire structures separately arranged in the amorphous carbon structure.

19. A loudspeaker comprising
a frame;
a magnetic circuit defining a magnetic gap, the magnetic circuit being mounted on the frame;
a damper received in the frame; and
a bobbin located in the magnetic gap and engaging with the damper;
wherein the bobbin comprises a stratiform composite structure comprising an amorphous carbon structure and a carbon nanotube film structure composited with the amorphous carbon structure; wherein the amorphous carbon structure and the carbon nanotube film structure are combined by van der Waals attractive force and covalent bonds therebetween.

20. The loudspeaker as claimed in claim 19, wherein the stratiform composite structure has a hollow tubular structure comprising two amorphous carbon structures, and the carbon nanotube film structure is sandwiched between the two amorphous carbon structures.

* * * * *